Oct. 6, 1931.  W. S. BRUBAKER  1,825,775
AUTOMATIC CONTROL FOR PUMP EQUIPPED METER SYSTEMS
Filed Jan. 24, 1928   2 Sheets-Sheet 1

INVENTOR.
WALTER S. BRUBAKER.
By Eugene C. Gott, Jr.
Attorney.

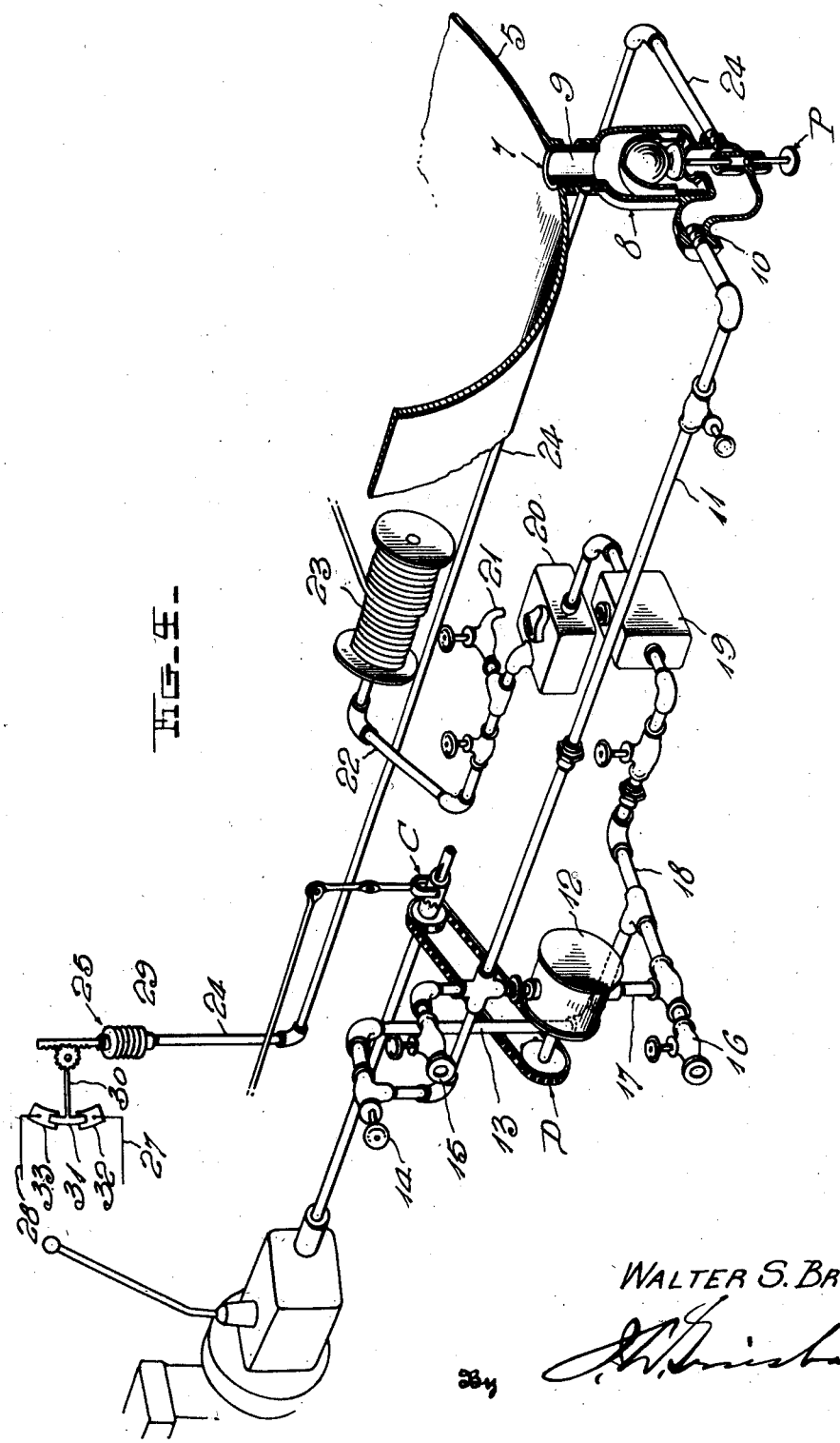

Patented Oct. 6, 1931

1,825,775

UNITED STATES PATENT OFFICE

WALTER S. BRUBAKER, OF OAKLAND, CALIFORNIA, ASSIGNOR TO GRANBERG METER CORPORATION, OF SAN FRANCISCO, CALIFORNIA, A CORPORATION OF CALIFORNIA

AUTOMATIC CONTROL FOR PUMP EQUIPPED METER SYSTEMS

Application filed January 24, 1928. Serial No. 249,188.

This invention relates primarily to liquid handling apparatus embodying a meter in a liquid discharge line leading from a reservoir, for instance, the tank of a tank truck, but certain features of the invention are adaptable also to apparatus in which there is no meter in the discharge line, then serving to prevent travel of air from the reservoir through the discharge line, which might be desirable for purposes other than protecting a meter against improper registering.

In the use of meters to measure the contents being taken from the tanks of tank trucks, it is essentially important that air be excluded from the meter. This is necessary, because, should air be admitted, or even be in the line, it passes through the meter and the latter registers just as if the liquid were passing through. One way of permitting air to enter the line is to allow a tank to drain completely, with the result that air passes through the meter and remains in the line even when the tank is refilled.

Heretofore, this has presented a real problem where fuel or stove oil is delivered by tank truck, and the truck is provided with a pump, which is required to pump the oil out of the tank, due to the difficulty in delivering the oil to tanks some distance from the truck. When a delivery is made, the operator is usually some distance away from his truck at the point of delivery and if through inadvertence, negligence or otherwise the tank becomes drained, the pump continues to operate and air is passed through the meter, rendering the reading on the meter worthless as a correct measurement. When the tank is refilled, the next reading is also inaccurate, due to air in the line between the tank and the meter.

One object of this invention is, therefore, to overcome these difficulties and prevent inaccuracies in meter readings by positively excluding air from the meter and the piping system connected therewith.

It has been found that in cases where tanks are drained by gravity, a cutoff valve, such as a float valve, attached to the tank in the discharge line may be used to stop the flow when the tank is drained. Such an arrangement is, of course, not entirely adequate, where a pump is used, for after the valve is closed there still remains a suction on the discharge side of the valve which may cause liquid to be withdrawn from the line creating a void, which may later fill with air (or with gases if handling volatile liquid such as gasoline or other refined petroleum oil), thereby causing false registering of the meter upon the next operation of the pump.

It is hence a further object of this invention to provide an automatic means of stopping the pump when the cutoff valve closes.

Briefly, this may be accomplished by inserting a pressure-controlled switch in the ignition circuit of the motor driving the pump. The pressure-controlled operating means of the switch is connected to the discharge side of the cutoff valve and when the valve closes, the continued suction of the pump causes a sharp decrease in pressure which actuates the switch, causing it to interrupt the ignition, thereby stopping the motor and the pump. The switch employed is preferably provided with adjustable contacts in order to adapt the device to different ignition systems. In a system using a battery the switch should break the primary circuit while in a magneto system the switch should be positioned so that when the valve closes said switch completes the ground circuit and interrupts the ignition.

A still further object is to provide an arrangement of parts whereby the truck motor cannot again be started after automatic stopping, without the operator first acting to restore the motor-stopping means to its initial idle position, thereby reminding him that he must also throw out the pump driving means. In this connection, a still further aim is to provide for immediate stopping of the motor if it be started without throwing out said pump driving means, it being thereby insured that the operator shall not drive the truck back to the reservoir tanks at the yard, with the pump operating.

In the acompanying drawings, this invention has been shown applied to a tank truck of any standard make and in which:

Fig. 4 is a diagrammatic perspective view of the entire association of parts forming the gist of the invention.

Figure 2:
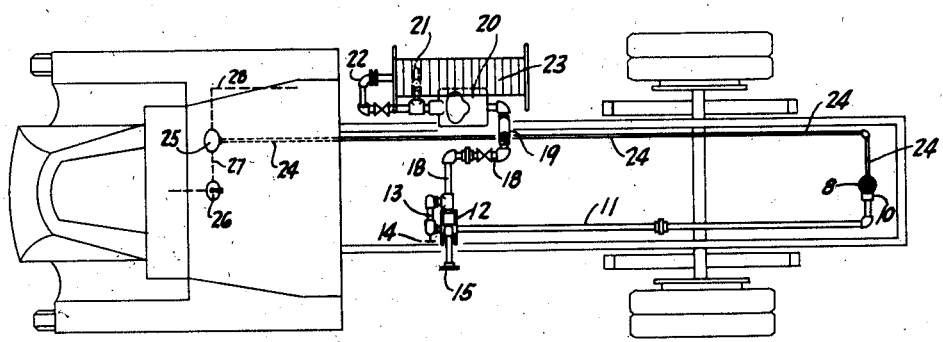
Fig. 2 is a top plan view of the truck with the tank and the cab removed.
Figure 1:
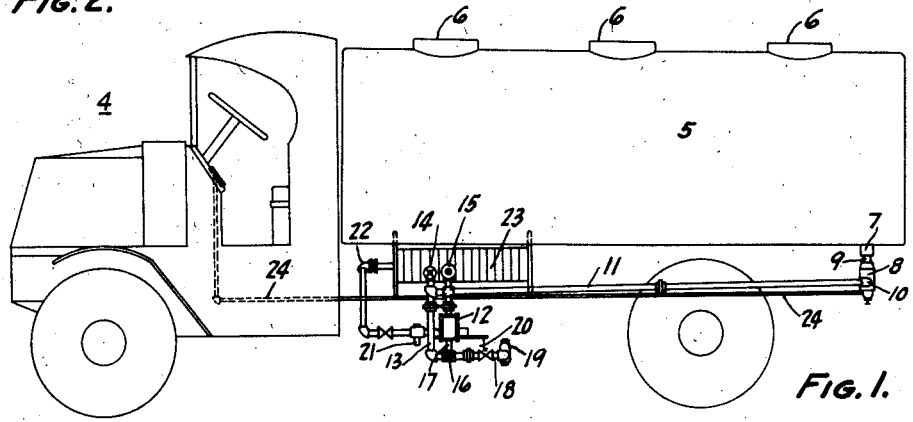
Fig. 1 is an elevation of a tank truck equipped with this invention.
Figure 3:
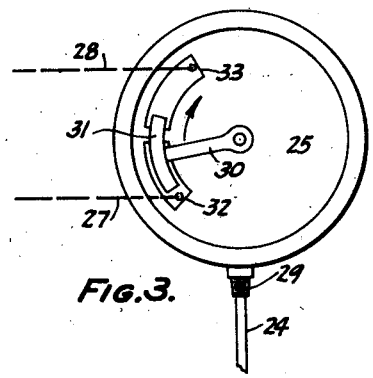
Fig. 3 is a diagrammatic illustration of the pressure-controlled switch.

In the drawings, the numeral 4 represents generally a tank truck of any standard make, designed more specially to contain liquid petroleum products and in which 5 designates a tank having inlets 6 and a discharge 7. The automatic control valve 8 has an inlet 9 and outlet 10, the latter being connected by the discharge line 11 to the rotary pump 12. The type of control valve disclosed is of the general construction shown in my co-pending application, Serial No. 253,838, filed February 13th, 1928.

The pump 12 is provided with a by-pass 13, having a relief valve 14, and is also equipped with an auxiliary suction inlet 15 and an auxiliary discharge 16. This auxiliary inlet and discharge may be utilized in many instances, such as to pump another tank dry or to fill the tank 5 of the truck. From the discharge side 17 of the pump 12 the liquid is pumped through the line 18 to the strainer 19 and thence to the meter 20. From the meter, the liquid may be discharged through a faucet 21 or carried through pipe 22 to a hose and reel 23.

The valve 14 may be of any desired type. It is normally closed but is intended to open upon excess pressure in the line at the discharge side of the pump 12, caused for instance by closing of the usual discharge valve at the end of the hose while the pump is running. When valve 14 opens, liquid merely circulates through the by-pass 13 from the discharge side of the pump 12 back to the intake side thereof, thereby insuring against mishap, such as blowing out of the hose.

The discharge side of the control valve 8 is tapped by line 24 which is connected at 29 with a bellows or the like B constituting part of the operating means for a pressure-controlled switch 25, which in turn is electrically connected to the ignition switch 26 by the connection 27, and to the battery by the connection 28. This switch 25 may be of any standard type and as shown, embodies a hand 30 having a sliding contact 31 which completes the circuit between the stationary contacts 32 and 33. This hand 30 is actuated by decrease in pressure at the discharge side of valve 8 to move in the direction of the arrow and break the circuit. While one type of pressure-controlled switch has been used in this illustration, it is obvious that other types may be utilized.

In operation, the pump 12 is driven by the motor of the truck through suitable driving connections D embodying a clutch C, and when the tank is emptied the level of the liquid recedes to the float-actuated control valve 8, which closes, leaving a small amount of liquid in the valve. By the action of this valve 8, liquid is trapped in the line between said valve and the meter, thereby preventing the admission of air to the latter. If the pump were permitted to further operate after closing of the valve, the liquid might be partially drawn out and air or gas sucked in through the valve 8, if it should not be absolutely air tight, but this may be prevented by automatically stopping the motor when the valve 8 closes. As soon as this valve closes, the pump 12 creates a sharp reduction of pressure on the discharge side of said valve and in line 24, which actuates the switch 25 to interrupt the ignition and stop the motor. Before the motor can again be started, the reduced pressure in the line 24 must be again restored. This may be done by manually or otherwise opening valve 8 momentarily, a push pin P being shown for this purpose. This restoration of pressure in line 24, permits the switch 25 to return to its normal closed position and allows starting of the motor. Before such starting, the pump clutch C should be thrown out, but if the operator starts the motor without throwing out said pump clutch, the ignition system will again be interrupted, stopping the motor and preventing the pump from forcing air to or through the meter.

Having now particularly described the preferred form of this invention, what I claim is:

1. In combination, a liquid reservoir, a liquid discharge line leading therefrom, a liquid meter in said discharge line, a pump in said line for discharging liquid through the latter and the meter, and means for automatically effecting stopping of the pump upon emptying of the reservoir, thereby preventing said pump from discharging air from the reservoir through the meter and causing false registering of the latter.

2. In combination, a liquid reservoir, a discharge line leading therefrom, a liquid meter in said discharge line, a motor-driven pump in said line for discharging liquid through the line and meter, control means for stopping the pump motor, and automatic operating means for said control means adapted to effect stopping of the pump motor upon emptying of the reservoir, thereby preventing the pump from discharging air from the reservoir through the meter and causing false registering of the latter.

3. In combination, a liquid reservoir, a liquid discharge line leading therefrom, a liquid meter in said line, a pump in the line for discharging liquid through said meter, automatic valve means for closing said line against further discharge of liquid upon emptying of said reservoir, and means for automatically effecting pump stopping upon closing of said valve means, thereby preventing the pump from discharging air from the reservoir through the meter and causing false registering of the latter.

4. In combination, a liquid reservoir, a liquid discharge line leading therefrom, a liquid meter in said line, a pump in said line for discharging liquid through the meter, automatic means for effecting a sharp drop in pressure in said line upon emptying of said reservoir, and means actuated by said pressure drop for effecting pump stopping, thereby preventing the pump from discharging air from the reservoir through the meter and causing false registering of the latter.

5. In combination, a liquid reservoir, a liquid discharge line leading therefrom, a liquid meter in said line, a pump in said line for discharging liquid through said meter, automatic valve means adapted to close said line against further discharge of liquid upon emptying of the reservoir, whereby a sharp drop in pressure will then be created at the discharge side of said valve means, and pump-stopping means actuated by said pressure drop, thereby preventing the pump from discharging air from the reservoir through the meter and causing false registering of the latter.

6. In combination, a motor-driven tank truck, a discharge line from the tank of said truck, a liquid meter and a liquid pump in said line, manually-controlled driving means between the truck motor and said pump, automatic means for applying a force created by said pump to stop the truck motor upon emptying of the tank, thereby preventing discharge of air from the tank through the meter; also delaying operation of the truck motor until after resetting of said motor-stopping means at its normal inactive position and throwing out of the pump operating means, and manually-controlled means for accomplishing said resetting of said motor-stopping means.

7. In combination, a motor-driven tank truck, a discharge line from the tank of said truck, a liquid meter and a liquid pump in said line, manually controlled driving means between the truck motor and said pump, automatic valve means for closing said line upon emptying of the tank, whereby a sharp drop in pressure will be created at the discharge side of said valve means, means actuated by said pressure drop for stopping the truck motor and consequently stopping the pump, thereby first, preventing said pump from discharging air from the tank through the meter, second, preventing re-starting of the truck motor until said stopping means is reset at its normal inactive position, and third, again causing motor stopping if started without throwing out the pump driving means; and manually-actuated means for momentarily opening said valve means to restore normal pressure in the line, allowing said motor stopping means to return to its normal inactive position.

8. In combination, a liquid reservoir, a discharge line leading therefrom, a pump in said line for discharging liquid therethrough, driving means for said pump, and means for automatically effecting pump stopping upon emptying of the reservoir, thereby preventing travel of air from the reservoir to the pump.

9. In combination, a liquid reservoir, a discharge line leading therefrom, a motor-driven pump in said line for discharging liquid therethrough, control means for stopping the pump motor, and automatic operating means for said control means adapted to effect motor stopping upon emptying of the reservoir, thereby preventing travel of air from the reservoir to the pump.

10. In combination, a liquid reservoir, a discharge line leading therefrom, a pump in said discharge line for discharging liquid therethrough, automatic valve means for closing said line against further discharge of liquid upon emptying of said reservoir, and means for automatically effecting pump stopping upon closing of said valve means.

11. In combination, a liquid reservoir, a liquid discharge line leading therefrom, a pump in said discharge line for discharging liquid therethrough, automatic means for effecting a sharp drop in pressure in said line upon emptying of said reservoir, and pump-stopping means actuated by said pressure drop.

12. In combination, a liquid reservoir, a discharge line leading therefrom, a pump in said discharge line for discharging liquid therethrough, automatic valve means for closing said line against further discharge of liquid upon emptying of said reservoir, whereby a sharp drop in pressure will be created at the discharge side of said valve means, and pump stopping means actuated by said pressure drop.

13. In combination, a motor driven tank truck, a pump for discharging liquid from the tank of said truck, manually-controlled driving means between the truck motor and said pump, and means for automatically stopping said motor upon predetermined recession of liquid in said tank, said motor-stopping means embodying provision for again stopping the truck motor if the latter be re-started without first throwing out said pump-driving means.

14. In combination, a motor-driven tank truck, a pump for discharging liquid from the tank of said truck, manually-controlled driving means between the truck motor and said pump, and automatic means for applying a force created by said pump to stop said truck motor upon predetermined recession of liquid in said tank, whereby said automatic motor stopping means will again function if the motor be re-started without first throwing out said pump-driving means.

WALTER S. BRUBAKER.